J. C. MOONEY.
TIRE FOR VEHICLE WHEELS.
APPLICATION FILED FEB. 12, 1917.
1,276,247.
Patented Aug. 20, 1918.
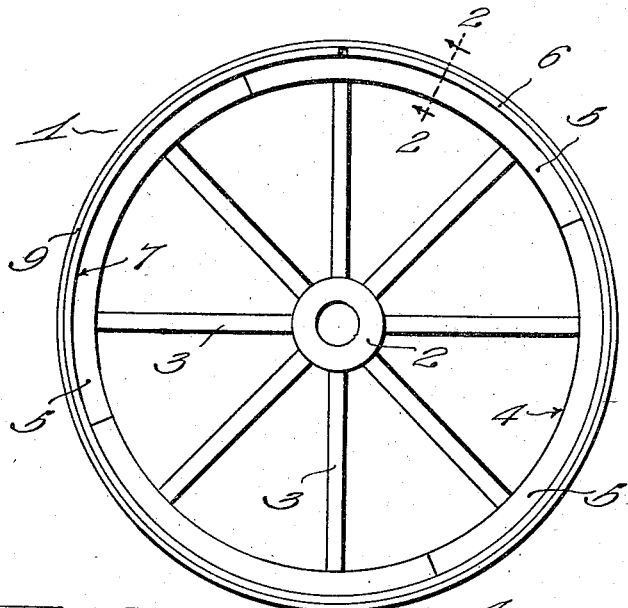
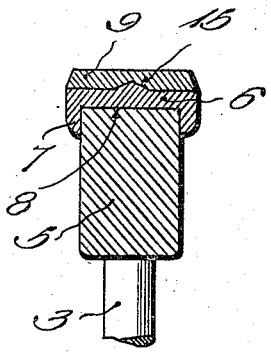
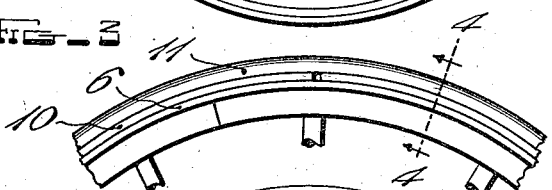
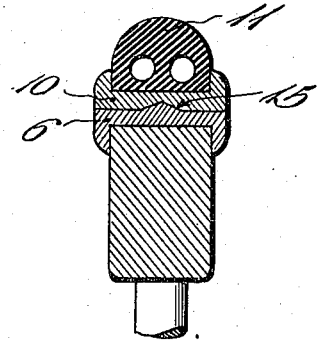
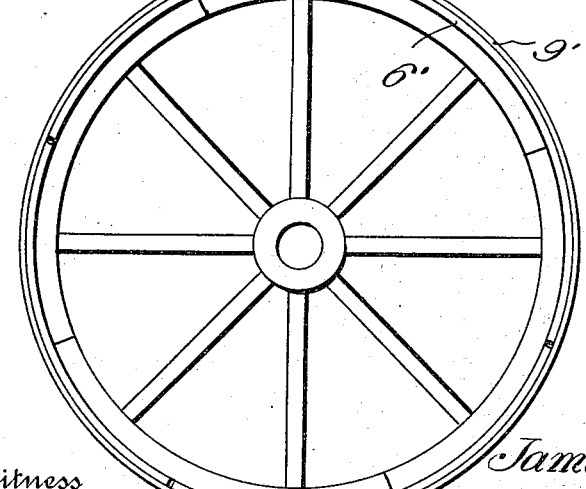
Witness
Inventor
James C. Mooney
By
Attorneys

UNITED STATES PATENT OFFICE.

JAMES CHRISTOPHER MOONEY, OF HOT SPRINGS, ARKANSAS, ASSIGNOR OF ONE-HALF TO CHESTER S. ROUSE, OF HOT SPRINGS, ARKANSAS.

TIRE FOR VEHICLE-WHEELS.

1,276,247. Specification of Letters Patent. Patented Aug. 20, 1918.

Application filed February 12, 1917. Serial No. 148,191.

*To all whom it may concern:*

Be it known that I, JAMES C. MOONEY, a citizen of the United States, residing at Hot Springs, in the county of Garland and State of Arkansas, have invented certain new and useful Improvements in Tires for Vehicle-Wheels; and I do declare the following to be a full, clear, and exact description of the invention, such as will enable others skilled in the art to which it appertains to make and use the same.

This invention relates to new and useful improvements in tires for carriages, wagons and the like.

The principal object of the invention is to provide an improved tire which will effectively hold the several sections of the felly of a vehicle wheel in alinement, thereby forming a wheel of considerable strength.

An additional object is to provide a tire formed of two or more parts, an inner portion for engagement with the periphery and sides of the felly of the wheel, and an outer part to be shrunk upon the inner part.

With these and other objects in view, the invention resides in certain novel features of construction, combination and arrangement of parts which will be hereinafter more particularly described and claimed and shown in the drawings wherein:

Figure 1 represents a side elevation of a wagon wheel having one form of my invention applied thereto;

Fig. 2 is a vertical transverse section on the line 2—2 of Fig. 1;

Fig. 3 is a side elevation of a portion of a carriage wheel showing a metallic tire constructed in accordance with my invention and adapted to receive a rubber tire;

Fig. 4 is a vertical section on the plane of the line 4—4 of Fig. 3; and,

Fig. 5 is a side elevation of a portion of a wheel showing a third form of my invention.

Referring more particularly to the several figures of the drawing wherein similar reference characters are placed on corresponding parts, 1 denotes a wheel having a hub 2 from which spokes 3 radially extend and which are connected at their outer ends by a felly 4 composed in the usual manner of a plurality of sections 5. In an ordinary carriage or wagon wheel, these sections 5 are held together by a metallic band which is shrunk thereon, said band forming the tire. Such a tire does not prevent the parts of the felly from getting out of alinement when the wheels are subjected to unusual strains.

My invention is designed to effectively brace the several sections 5 of the felly and thereby greatly strengthen and prolong the life of the wheel. This is carried out by providing a tire 6 for engaging the periphery of the felly which has an inwardly extending flange 7 on each longitudinal edge, these flanges projecting inwardly toward the hub 2 and engaging the opposite sides of the felly. The flanges are of such width that a relatively deep channel 8 is formed in the tire.

In one form of my invention this tire 6 is in the form of a band, the ends of which are slightly spaced apart when it is disposed on the felly. An outer tire 9 is adapted to be placed on the channeled tire 6 and is shrunk thereon in the usual manner to be maintained in proper position. By shrinking the outer tire upon the inner, the ends of the latter are brought closer together and therefore the various sections 5 of the felly 4 will be very effectively held together.

The plain flat band 9 is adapted to be used on wagons and other heavy vehicles, a slightly different form of outer tire being used in connection with the wheel for carriages and light vehicles where it is frequently desired to use rubber tires. In this case a channel-shaped tire 10 is shrunk upon the inner tire 6 as shown in Figs. 3 and 4. This serves the same purpose as the first mentioned tire 9, and in addition provides a channel for the reception of a rubber or other resilient tire 11.

A third manner of constructing the invention is illustrated in Fig. 5, from which will be seen that the inner channeled tire 6' may be composed of a plurality of parts, each of which is similar to the tire 6 in cross section and serves the same purpose. When the outer tire 9' is shrunk on these several parts composing the tire 6', they will be effectively held together in position.

Ordinarily it is necessary to hold the metallic tire to the felly by means of a plurality of bolts spaced predetermined distances around the tire, these bolts preventing lateral shifting of the tire with respect to the felly. The same would also be necessary in the parts of my invention, but in order to both lessen the cost of construction and to provide a stronger device, the band of the outer tire designated in the several forms by the numerals 9, 10 and 9' is provided with a circumferentially extending V-shaped groove 15, said groove being formed midway between the edges of the band as shown. The band of the inner tire has formed thereon an outwardly projecting V-shaped rib for engagement with the groove, said rib extending circumferentially. When the outer band has been shrunk into position on the inner band and the rib disposed in the groove, the parts will be prevented from shifting laterally as is obvious.

While I have shown and described the rib 15 as being V-shaped, it is to be understood that it may be of any other cross sectional shape.

From the foregoing description taken in connection with the accompanying drawings, it will be obvious that I have invented a very simply constructed vehicle tire which will be a great improvement over any of those now in use, inasmuch as it will greatly strengthen the wheel upon which it is used and will lengthen its period of usefulness. Various minor changes may be made in the size and shape of the several parts without departing from the spirit of the invention.

I claim:—

The combination with a wagon wheel felly formed of a plurality of arcuate sections abutting each other at their ends, of a flat inner tire surrounding said felly and formed of similar arcuate sections extending over the joints between said felly sections, each of said tire sections having on its edges a pair of inwardly extending flanges extending throughout its length and spaced apart a distance equal to the greatest width of the felly, said flanges contacting with the opposite sides of said felly to hold the sections thereof in alinement, the longitudinal centers of each tire section having an external V-shaped rib extending throughout its length and of less width than the tire, the sides of said rib being disposed at an obtuse angle to each other, and a flat outer one-piece tire snugly surrounding said inner tire and shrunk thereon, said outer tire being equal in width to said inner tire and having a central internal V-shaped groove snugly receiving the rib of the inner tire, the circumference of the inner tire at the vertex of the rib being substantially the same as the internal circumference of the outer tire when expanded by heat.

In testimony whereof I have hereunto set my hand in the presence of two subscribing witnesses.

JAMES CHRISTOPHER MOONEY.

Witnesses:
 WALTER STONE,
 BILL SMITH.

Copies of this patent may be obtained for five cents each, by addressing the "Commissioner of Patents, Washington, D. C."